United States Patent
Remis et al.

(10) Patent No.: US 10,210,110 B2
(45) Date of Patent: Feb. 19, 2019

(54) ASSOCIATING DATA BUSES AND MANAGEMENT BUS CONNECTIONS FOR PERIPHERAL DEVICES

(71) Applicant: LENOVO Enterprise Solutions (Singapore) PTE. LTD., New Tech Park (SG)

(72) Inventors: Luke Remis, Raleigh, NC (US); Mark E. Andresen, Cary, NC (US); Wilson Velez, Raleigh, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 116 days.

(21) Appl. No.: 15/265,655

(22) Filed: Sep. 14, 2016

(65) Prior Publication Data

US 2018/0074981 A1  Mar. 15, 2018

(51) Int. Cl.
| | |
|---|---|
| *G06F 13/22* | (2006.01) |
| *G06F 13/38* | (2006.01) |
| *G06F 13/40* | (2006.01) |
| *G06F 13/42* | (2006.01) |

(52) U.S. Cl.
CPC ............ *G06F 13/22* (2013.01); *G06F 13/385* (2013.01); *G06F 13/4022* (2013.01); *G06F 13/4282* (2013.01)

(58) Field of Classification Search
None
See application file for complete search history.

(56) References Cited

U.S. PATENT DOCUMENTS

| | | | | |
|---|---|---|---|---|
| 4,683,531 A | * | 7/1987 | Kelch ..................... | G06F 13/22 340/3.51 |
| 5,329,528 A | * | 7/1994 | Akai .................. | H04L 12/40013 370/445 |
| 5,862,375 A | * | 1/1999 | Gephardt ............ | G06F 12/0684 710/10 |
| 6,202,103 B1 | * | 3/2001 | Vonbank ............... | G06F 11/221 710/15 |
| 6,968,406 B2 | * | 11/2005 | Merkin ............... | G06F 13/4031 710/107 |
| 2014/0325096 A1 | * | 10/2014 | Jung ...................... | G06F 13/126 710/16 |
| 2016/0066173 A1 | * | 3/2016 | Glazer .................. | H04W 8/005 370/338 |

* cited by examiner

*Primary Examiner* — Elias Mamo
(74) *Attorney, Agent, or Firm* — Kunzler, PC

(57) ABSTRACT

An apparatus, system, method, and program product are disclosed for associating data buses and management buses for peripheral devices. A command module sends a command to a peripheral device to trigger activity on the peripheral device. The peripheral device is communicatively coupled to an information handling device using a separate data bus and a management bus connection of a management bus. The command is sent over the data bus to the peripheral device. A monitor module checks the management bus of the information handling device to determine which management bus connection is connected to the peripheral device that was active in response to the sent command. An association module associates the determined management bus connection with the data bus on which the command was sent and with the peripheral device.

20 Claims, 6 Drawing Sheets

ASSOCIATING DATA BUSES AND MANAGEMENT BUS CONNECTIONS FOR PERIPHERAL DEVICES

FIELD

The subject matter disclosed herein relates to peripheral computing devices and more particularly relates to associating separate data buses and management buses of peripheral devices.

BACKGROUND

Computing devices may include peripheral devices that are coupled to the computing device using one or more communication buses. The communication buses may be part of the same cable, or may be separated into different cables to reduce cable size and system complexity. Using different communication bus cables for a single peripheral device, however, may cause problems in the computing device, such as when a pair of communication bus cables that should both be connected to the same peripheral device are each connected to different peripheral devices.

BRIEF SUMMARY

An apparatus for associating data buses and management buses for peripheral devices is disclosed. A method and computer program product also perform the functions of the apparatus.

An apparatus includes a command module sends a command to a peripheral device of one or more peripheral devices to trigger activity on the peripheral device. The peripheral device is communicatively coupled to an information handling device using a separate data bus and a management bus connection of one or more management buses. The command is sent over the data bus to the peripheral device. A monitor module checks the one or more management buses of the information handling device to determine which management bus connection is connected to the peripheral device that was active in response to the sent command. An association module associates the determined management bus connection with the data bus on which the command was sent and with the peripheral device.

In one embodiment, the monitor module polls each of the one or more peripheral devices using a management bus connection to each of the one or more management buses until the monitor module determines which peripheral device of the one or more peripheral devices was active in response to the sent command. In a further embodiment, the monitor module determines whether a peripheral device of the one or more peripheral devices is active by reading data available through a management bus connection to a peripheral device. The data may include information indicating whether the peripheral device was active in response to the sent command.

In some embodiments, each of the one or more peripheral devices is connected to one or more addressable management buses and a management bus connection to a peripheral device of the one or more peripheral devices includes an addressable management bus connection. In various embodiments, each of the one or more peripheral devices is connected to a separate management bus. Each management bus connection may include a connection over a single management bus between the information handling device and a peripheral device of the one or more peripheral devices.

In one embodiment, the monitor module monitors each of the one or more management bus connections for data sent from the peripheral device, responsive to the command, that indicates which of the one or more management bus connections is coupled to the peripheral device. In some embodiments, the association module maintains a map of associations between management bus connections, data buses, and peripheral devices such that a management bus connection coupled to a peripheral device is correlated with a data bus coupled to the peripheral device.

In a further embodiment, the apparatus includes a device module that determines, at system startup, the one or more peripheral devices communicatively coupled to the information handling device by determining which of a plurality of data buses are connected to a peripheral device. In some embodiments, the command module sends the command to a peripheral device, the monitor module determines a management bus connection, and the association module associates the data bus, the peripheral bus, and the management connection for each determined peripheral device.

In some embodiments, the command module repeatedly sends the command until the monitor module determines which management bus connection is connected to the peripheral device that was active in response to the sent command. In certain embodiments, the command sent to the peripheral device on the data bus includes a read request command for data stored on the peripheral device. The peripheral device may include a peripheral storage device such that the data of the read request is discarded without being processed by the information handling device.

In one embodiment, the apparatus includes an activity module that detects, over a management bus connection of the one or more management buses, an activity indicator for the peripheral device. The activity indicator may be triggered in response to the peripheral device processing the command sent to the peripheral device. In some embodiments, the activity indicator includes detecting a light emitting diode ("LED") toggle its state between on and off. In a further embodiment, the peripheral device includes a non-volatile memory express ("NVMe") storage device. In various embodiments, the data bus includes a peripheral component interconnect express ("PCIe") communication bus.

A method includes sending a command to a peripheral device of one or more peripheral devices to trigger activity on the peripheral device. The peripheral device is communicatively coupled to an information handling device using a separate data bus and a management bus connection of one or more management buses. The command is sent over the data bus to the peripheral device. The method includes checking the one or more management buses of the information handling device to determine which management bus connection is connected to the peripheral device that was active in response to the sent command. The method includes associating the determined management bus connection with the data bus on which the command was sent and with the peripheral device.

In one embodiment, the method includes polling each of the one or more peripheral devices using a management bus connection to each of the one or more management buses until it is determined which peripheral device of the one or more peripheral devices was active in response to the sent command.

In one embodiment, determining whether a peripheral device of the one or more peripheral devices is active includes reading data available through a management bus connection to a peripheral device. The data may include information indicating whether the peripheral device was active in response to the sent command. In some embodiments, each of the one or more peripheral devices is connected to one or more addressable management buses and a management bus connection to a peripheral device of the one or more peripheral devices includes an addressable management bus connection.

A program product includes a computer readable storage medium that stores code executable by a processor. The executable code includes code to perform sending a command to a peripheral device of one or more peripheral devices to trigger activity on the peripheral device. The peripheral device is communicatively coupled to an information handling device using a separate data bus and a management bus connection of one or more management buses. The command is sent over the data bus to the peripheral device. The executable code includes code to perform checking the one or more management buses of the information handling device to determine which management bus connection is connected to the peripheral device that was active in response to the sent command. The executable code includes code to perform associating the determined management bus connection with the data bus on which the command was sent and with the peripheral device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
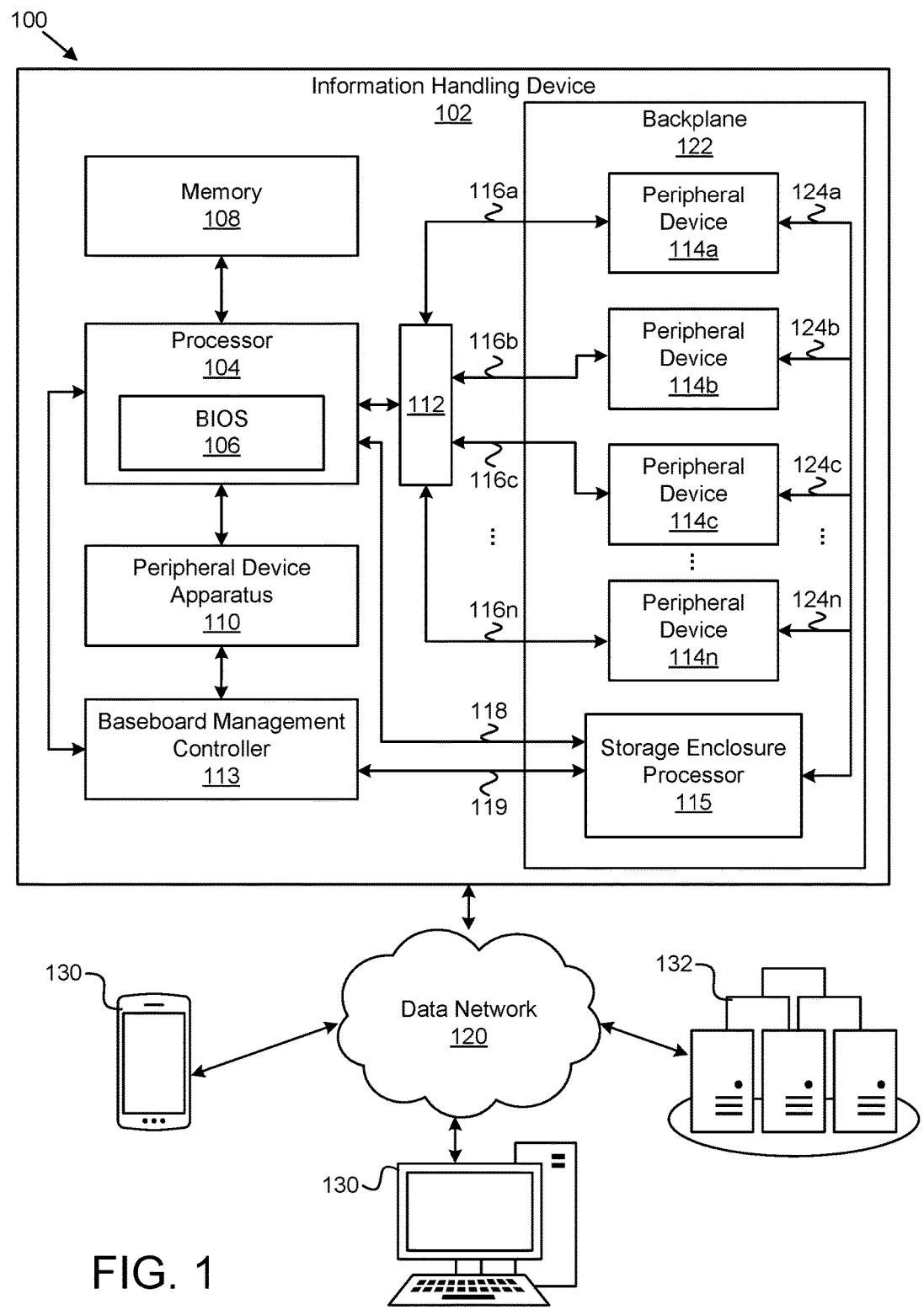
FIG. 1 is a schematic block diagram illustrating one embodiment of a system for associating data buses and management bus connections for peripheral devices.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts one embodiment of a system 100 for associating data buses and management bus connections for peripheral devices. In one embodiment, the system 100 includes an information handling device 102. The information handling device 102 may include a desktop computer, a laptop computer, a tablet computer, a smart phone, a set-top box, a gaming console, a smart TV, a smart watch, a fitness band or other wearable activity tracking device, an optical head-mounted display (e.g., a virtual reality headset, smart glasses, or the like), a personal digital assistant, or another computing device that includes a processor 104, a volatile memory 108, and/or a non-volatile storage medium, which may be embodied as at least one of the peripheral devices 114a-n.

The processor 104 may include one or more central processing units ("CPUs"), one or more processor cores, a field programmable gate array ("FPGA") or other programmable logic, an application specific integrated circuit ("ASIC"), a controller, a microcontroller, and/or another semiconductor integrated circuit device. The processor 104 may include firmware used to perform hardware initialization during the booting process, such as an instance of a basic input/output system ("BIOS") 106. The BIOS 106, in one embodiment, may include an instance of the Unified Extensible Firmware Interface ("UEFI") firmware.

The information handling device 102, in certain embodiments, includes one or more peripheral devices 114a-n (collectively 114). The peripheral devices 114, as used herein, may include internal and/or external devices that provide input and/or output for the information handling device 102. For example, the peripheral devices 114 may be embodied as storage devices (e.g., non-volatile memory ("NVM") devices, NVM express ("NVMe") devices, solid state storage devices ("SSSD"), and/or the like), flash memory devices, network cards, graphics cards, and/or the like.

In one embodiment, the peripheral devices 114 are connected to the information handling device 102 via a backplane 122. As used herein, a backplane 122 may be embodied as a printed circuit board ("PCB") that includes several slots for connecting multiple peripheral devices 114 or other circuit boards to the backplane 122. For example, the backplane 122 may include a plurality of slots, cable connections (e.g., data bus 116 and/or management bus 118 cable connections), and/or other types of connectors for connecting NVMe storage devices to the information handling device 102. As depicted in FIG. 1, the backplane 122 is enclosed within the information handling device 102. In another embodiment, the backplane 122 may be enclosed in a separate device, such as a separate storage enclosure, e.g., a storage rack, that is coupled to the information handling device 102 using one or more communication buses.

In certain embodiments, the peripheral devices 114 are communicatively coupled to the processor 104 using one or more communication buses 116a-n/118. In one embodiment, each peripheral device 114 is coupled to the processor 104 using a data bus 116a-n (collectively 116). For example, there may be a 1:1 relationship between the peripheral devices 114 and the data buses 116 such that each peripheral device 114 is coupled to the information handling device 102 using a separate and independent data bus 116.

The data bus 116 may be used to perform input/output ("I/O") operations (e.g., transmitting data) between the processor 104 and the peripheral devices 114. In some embodiments, the data bus 116 is embodied as a cable that is coupleable between the peripheral device 114 and the processor 104. The data bus 116 may also be coupled to the peripheral device 114 via one or more data lines on the backplane 122. In certain embodiments, the data bus 116 is a peripheral component interconnect ("PCI") bus, a PCI extended ("PCI-X") bus, an accelerated graphics port ("AGP") bus, a PCI express ("PCIe") bus, a universal serial bus ("USB"), a serial advanced technology attachment ("SATA") bus, and/or the like.

In one embodiment, a management bus 118 is configured to transmit management messages to/from the processor 104 from/to the peripheral devices 114. A management bus 118 may be embodied as an Inter-Integrated Circuit ("I²C") communication bus. Management messages may include messages that control a state of the peripheral device 114, such as power on/power off, disable/enable, standby, reset, and/or the like. For example, an operating system running on the information handling device 102 may send a message over a management bus 118 to reset a storage device attached to the information handling device 102 over a PCIe cable. A management bus 118 may be embodied as a cable connected between the information handling device 102, e.g., the processor 104 and/or the peripheral device apparatus 110, and the backplane 122. Even though only one management bus 118 is depicted in FIG. 1, multiple management buses 118 may be used to connect to peripheral devices 114 on a single backplane 122 or multiple backplanes 122.

In some embodiments (not shown), each management bus 118 is communicatively coupled to a single corresponding peripheral device 114. In such an embodiment, there may be a 1:1 relationship between management buses 118 and peripheral devices 114 such that each peripheral device 114 is coupled to the information handling device 102 using a separate and independent management bus connection 124 of a management bus 118. Referring to FIG. 1, instead of using a single management bus 118 connected to the backplane 122 that is associated with a plurality of management bus connections 124, each management bus connection 124 for a peripheral device 114 would be associated with a separate and distinct management bus 118. For example, each peripheral device 114 may be coupled to a corresponding management bus cable, instead of using a single management bus cable to manage multiple peripheral devices 114.

In another embodiment, as shown in FIG. 1, there may be a 1:n or one-to-many relationship between a management bus 118 and the peripheral devices 114. In such an embodiment, a management bus 118 may include a plurality of management bus connections 124a-n (collectively 124) that are each connectable to a peripheral device 114 and addressable using an identifier, a unique address (e.g., an address for the management bus connection 124, an address for a peripheral device 114, or the like), and/or the like. In such an embodiment, the management bus 118 may be connected to a storage enclosure processor ("SEP") 115 for the backplane 122. As used herein, a SEP 115 may be a processor located on the backplane 122 for managing peripheral devices 114 on the backplane 122.

For instance, the SEP 115 may manage the management bus connections 124 for the management bus 118 to transmit management messages between the information handling device 102 and the peripheral devices 114 on the backplane 122 based on a unique address for the management bus connection 124 and/or the peripheral device 114. For example, an operating system for the information handling device 102 may send a reset command to a peripheral device 114 by providing an identifier or address for the peripheral device 114 and/or the management bus connection 124 of the management bus 118. In such an example, the SEP 115 may use the provided identifier or address to send the reset command to the peripheral device 114 associated with the identifier or address. In a further example, the SEP 115 may translate, map, or otherwise cross-reference the provided identifier or address to a different identifier or address used to communicate with the peripheral device 114 on the backplane 122.

As used herein, a management connection between the processor 104, peripheral device apparatus 110, or the like and a peripheral device 114 is known as a management bus connection 124 whether there is a single management bus 118 connected to each peripheral device 114 (e.g., one management bus connection 124 per management bus 118) or a single management bus 118 connected to multiple peripheral devices 114 (e.g., multiple addressable management bus connections 124 per management bus 118).

The baseboard management controller ("BMC") 113, in one embodiment, is a specialized hardware component of the information handling device 102 that is used to manage the interface between system management software, such as the BIOS 106, an operating system, or other management software, and platform hardware such as the peripheral devices 114 using a system management bus 119. For example, the BMC 113 may manage the transmission of management messages between the processor, the BIOS 106, the peripheral device apparatus 110, an operating system, and/or the like, and the peripheral devices 114, the SEP 115, and/or the like.

The bridge 112, in one embodiment, connects the peripheral devices 114 to the processor 104 and/or peripheral device apparatus 110 via data buses 116. The bridge 112 may act as a switch and may direct data on the data buses 116 between the processor 104 and the respective peripheral devices 114. In certain embodiments, a plurality of bridges 112 may be located in the information handling device 102, with each bridge 112 connected to one or more peripheral devices 114.

The peripheral device apparatus 110, in one embodiment, is configured to associate or correlate a data bus 116 with a corresponding management bus connection 124 of a management bus 118 that is connected to the same peripheral device 114 as the data bus 116. In one embodiment, the peripheral device apparatus 110 sends a command over a data bus 116 to a peripheral device 114 to trigger activity on the peripheral device 114. The peripheral device apparatus 110, in a further embodiment, checks the management buses 118 of the information handling device 102 to determine which management bus connection 124 is connected to the peripheral device 114 that was active in response to the sent command. In some embodiments, the peripheral device apparatus 110 associates the determined management bus connection 124 with the data bus 116 on which the command was sent and with the peripheral device 114. In some embodiments, at least a portion of the peripheral device apparatus 110 is located on the processor 104, on the backplane 122, on the BMC 113, and/or on the SEP 115. The peripheral device apparatus 110 will be described in more detail below with reference to FIGS. 2 and 3.

In one embodiment, the information handling device 102 is connected to a data network 120. The data network 120, in one embodiment, includes a digital communication network that transmits digital communications. The data network 120 may include a wireless network, such as a wireless cellular network, a local wireless network, such as a Wi-Fi network, a Bluetooth® network, a near-field communication ("NFC") network, an ad hoc network, and/or the like. The data network 120 may include a wide area network ("WAN"), a storage area network ("SAN"), a local area network ("LAN"), an optical fiber network, the internet, or other digital communication network. The data network 120 may include two or more networks. The data network 120 may include one or more servers, routers, switches, and/or other networking equipment. The data network 120 may also include one or more computer readable storage media, such as a hard disk drive, an optical drive, non-volatile memory, RAM, or the like.

In one embodiment, the information handling device 102 is connected to one or more other computing devices 130/132 via the data network 106. The other computing devices 130, for example, may include smart phones, tablet computers, laptops, and/or the like. In a further embodiment, the other computing devices 132 may include servers, other devices in a data center located on a local or external data network 120, and/or the like.

Figure 2:
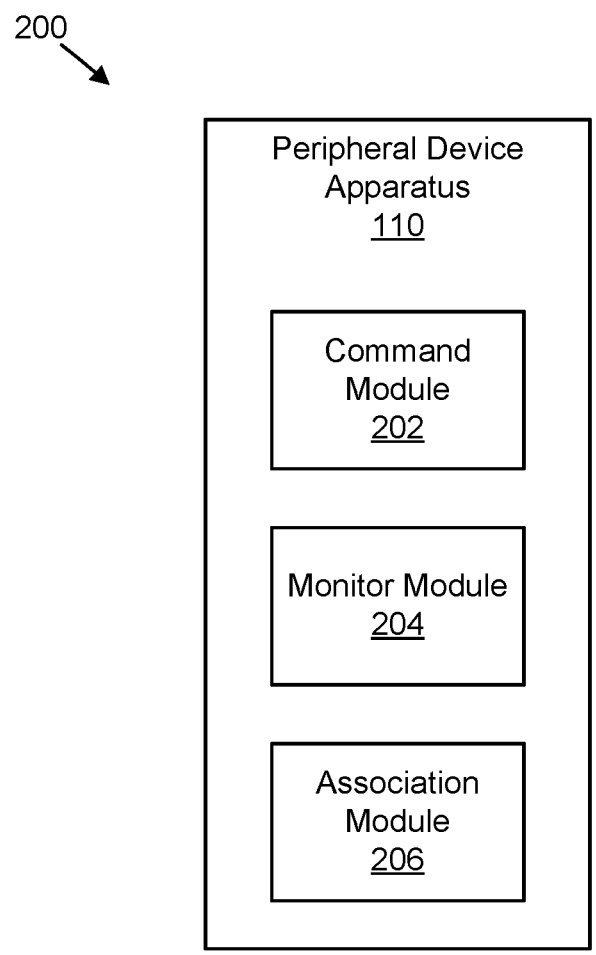
FIG. 2 is a schematic block diagram illustrating one embodiment of an apparatus for associating data buses and management bus connections for peripheral devices.

FIG. 2 depicts one embodiment of an apparatus 200 for associating data buses 116 and management bus connections 124 for peripheral devices 114. The apparatus 200 includes an embodiment of a peripheral device apparatus 110 with a command module 202, a monitor module 204, and an association module 206, which are described in more detail below.

The command module 202 sends a command to a peripheral device 114 to trigger activity on the peripheral device 114. In certain embodiments, the command module 202 sends the command on a data bus 116 connected to the peripheral device 114. The command module 202 may send a command based on the type of peripheral device 114 that is receiving the command. For example, if the peripheral device 114 is an NVMe storage device, the command module 202 may send a read request command for data stored on the peripheral device 114. In such an embodiment, the data of the read request may be discarded without being processed, read, transmitted, or the like by/to the processor 104, information handling device 102, a storage controller (not shown), and/or the like.

For example, in response to receiving a read request command at an NVMe storage device, the command module 202 may discard or ignore data read from the NVMe storage device to satisfy the read request command without transmitting the data over a PCIe data bus 116 coupled to the NVMe storage device. Other commands for different peripheral devices 114 may be used, such as network commands for a peripheral network card, graphic commands for a peripheral graphics card, sound commands for a peripheral sound card, and/or the like.

In certain embodiments, the command module 202 sends a management command to a peripheral device 114 using a management bus connection 124 of a management bus 118 to trigger an activity, a response, and/or the like on the peripheral device 114. For example, the command module 202 may send a reset command to a peripheral device 114 on a management bus connection 124 connected to the peripheral device 114 to place the peripheral device in a reset state (e.g., to turn the peripheral device 114 off and then on, to disable and then enable the peripheral device 114, or the like).

The monitor module 204 checks management bus connections 124 connected to the peripheral devices 114 to determine which management bus connection 124 of a management bus 118 was active in response to receiving the command that the command module 202 sent to the peripheral device 114. In one embodiment, the monitor module 204 polls each peripheral device 114 connected to the information handling device 102 using a management bus connection 124 until the monitor module 204 determines which peripheral device 114 was active in response to the sent message. For example, the monitor module 204 may send a query to the SEP 115 and/or the peripheral device 114 to check if the peripheral device 114 was active in response to the command sent to the peripheral device 114.

The monitor module 204, for example, may check an active bit that is set by the peripheral device 114 and/or the SEP 115 when the peripheral device 114 experiences activity in response to particular commands. In certain embodiments, the monitor module 204 reads data available through a management bus connection 124 of a management bus 118 to a peripheral device 114 to determine whether the peripheral device 114 experienced activity in response to the sent command. The data, for example, may be read from a storage or memory location associated with the peripheral device 114 and/or the SEP 115 and may include information that indicates whether the peripheral device 114 was active in response to the sent command. For example, the data may include an active bit that the peripheral device 114 or the SEP 115 may set to indicate whether the peripheral device 114 was active after the command module 202 sent the command. The data may include other data including, but not limited to, an identifier for the peripheral device 114, an identifier for the port that the peripheral device 114 is connected to, the type of command that was sent, and/or the like.

In a further embodiment, the monitor module 204 monitors one or more management bus connections 124 of a management bus 118 for data sent from the peripheral device 114 in response to the command being sent to the peripheral device 114 over the data bus 116 connected to the peripheral device 114. In some embodiments, the monitor module 204 monitors each of one or more management bus connections 124 in response to the command being sent to the peripheral device 114. For example, the command module 202 may send a read request command to a NVMe storage device on the PCIe data bus 116 coupled to the storage device. In response to the command module 202 sending the read request, the monitor module 204 may monitor each of the management bus connections 124 on the information handling device 102 for data indicating which peripheral device 114 received the read request to determine which peripheral device 114 the management bus 118 and/or management bus connection 124 is connected to.

In such an embodiment, the data may indicate which of the management bus connections 124 of a management bus 118 is coupled to the peripheral device 114 that received the command. For instance, an NVMe storage device may be connected to a PCIe data bus 116 on PCIe port 0. The command module 202 may send a read request command on to the peripheral device 114 on PCIe port 0. In response to the read request command being sent, the monitor module 204 may monitor each management bus connection 124 on the information handling device 102. The monitor module 204 may receive data on a management bus 118 coupled to management bus port 1 that indicates that the read request command was received on PCIe port 0 coupled to the NVMe storage device.

In one embodiment where the command module 202 sends a management command to a peripheral device 114 over a management bus connection 124 of a management bus 118 to trigger a response or an activity on the peripheral device 114, the monitor module 204 checks each of the peripheral devices 114 of the information handling device 102 to determine which of the peripheral devices 114 is responsive to the management command.

For example, the command module 202 may send a reset command to a particular peripheral device 114 over a management bus connection 124. The monitor module 204, in response to the reset command, may send a command on each data bus 116 connected to a peripheral device 114, such as a read request command, to determine which of the peripheral devices 102 is unresponsive, inactive, in a reset state, and/or the like. In this manner, the monitor module 204 can identify which data bus 116 is connected to the peripheral device 114 that received the management message on a particular management bus connection 124 because the monitor module 204 may not receive a response on a data bus 116 connected to the peripheral device 114 that has been reset. Accordingly, as described below, the management bus connection 124 and the data bus 116 can be correlated or associated with the peripheral device 114 that received the reset command.

In some embodiments, the command module 202 repeatedly sends the command on the data bus 106 and/or the management bus connection 124 of a management bus 118 to a peripheral device 114 until the monitor module 204 determines which management bus connection 124 is connected to the peripheral device that was active in response to the sent command. For example, the command module 202 may send a read request command every 100 milliseconds over a particular data bus 116 until it receives an indication from the monitor module 204 that a management bus connection 124 has been identified in response to the read request command. Thereafter, the command module 202 may send a command to the next identified peripheral device 114 until a management bus connection 124 has been identified for each peripheral device 114 of the information handling device 102.

The association module 206 associates, correlates, and/or the like, the identified management bus connection 124 of a management bus 118 with the data bus 116 that the command was sent over. Continuing with the previous example, the association module 206 may associate PCI port 0 with management bus port 1 for the specific NVMe storage device. In a further embodiment, the association module 206 may maintain a list, table, database, map, and/or the like of data bus 116 (e.g., data bus 116 ports), management bus 118 (e.g., management bus 118 ports), management bus connections 124 (e.g., addresses or identifiers for management bus connections 124), and peripheral device 114 associations, which may be used or referenced by a program, such as an operating system, to determine which management buses 118, and/or which management bus connections 124, and data buses 116 are coupled to a particular peripheral device 114.

As described above, in some embodiments, a peripheral device 114 may be coupled to an information handling device 102 using a separate data bus 116 cable and a separate management bus 118 cable, which may service a number of peripheral devices 114 via different addressable management bus connections 124. When the peripheral devices 114 are installed in an information handling device 102, there may not be any correlation or association between the data bus 116 cables and the management bus 118 cables, including the various addressable management bus connections 124 associated with a management bus 118 cable. Thus, for example, an NVMe storage device may be coupled to a data bus 116 cable on PCIe port 1 and a management bus 118 cable on management bus port 3. If an operating system, for example, wants to disable the NVMe storage device located on PCIe port 1, it may not know which management bus 118 port or management bus connection 124 address to use to send the disable command because there is no guarantee that the management bus 118 cable is coupled to the same port identifier as the data bus 116 cable, e.g., PCIe port 1. In this example, the management bus 118 cable is not coupled to the same port number as the PCIe port, which may cause issues with the NVMe storage devices if the operating system attempts to disable the NVMe storage device on PCIe port 1 by sending a disable command using management bus port 1 because it may be connected to a different NVMe storage device on a different PCIe port.

Accordingly, the association module 206 maintains a mapping of management buses 118/management bus connections 124 to data buses 116 coupled to a peripheral device 114 to ensure that the correct management buses 118, and/or management bus connections 124, and data buses 116 are being used for a particular peripheral device 114. In this manner, it does not matter which ports the data bus 116 cables and/or the management bus 118 cables and/or connections 124 are coupled to; the peripheral device apparatus 110 may dynamically determine the association or correlation between the data bus 116 and the management bus 118 and/or management bus connections 124, for each peripheral device 114 coupled to the information handling device 102.

Figure 3:
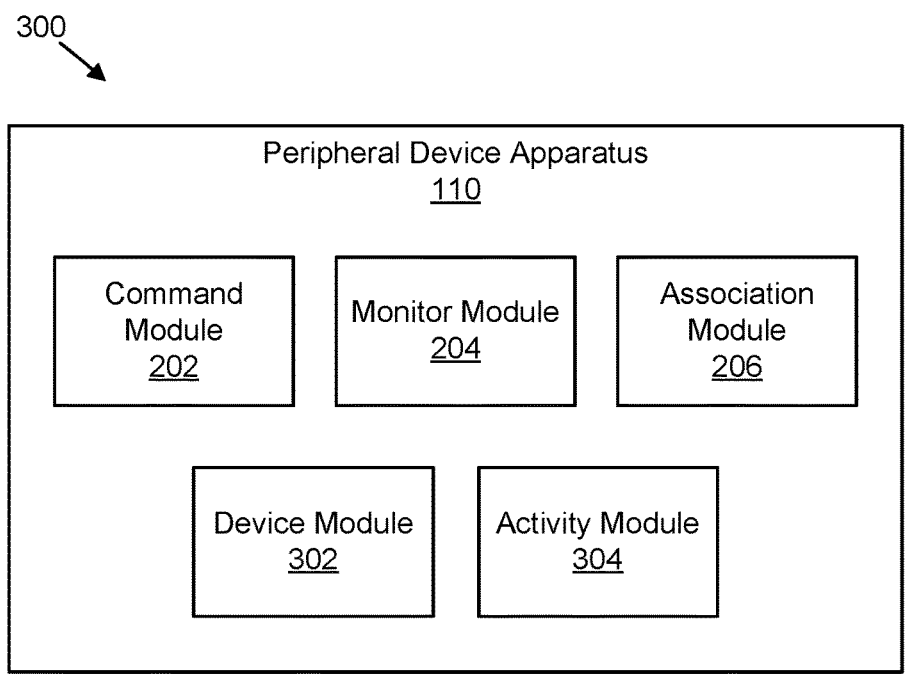
FIG. 3 is a schematic block diagram illustrating one embodiment of another apparatus for associating data buses and management bus connections for peripheral devices.

FIG. 3 depicts one embodiment of an apparatus 300 for associating data buses 116 and management bus connections 124 for peripheral devices 114. The apparatus 300 includes an embodiment of a peripheral device apparatus 110 with a command module 202, a monitor module 204, and an association module 206, which are similar to the command module 202, the monitor module 204, and the association module 206 described above. The peripheral device apparatus 110, in some embodiments, includes a device module 302 and an activity module 304, described below.

The device module 302, in one embodiment, determines which peripheral devices 114 are communicatively coupled to the information handling device 102. In some embodiments, the device module 302 scans each data bus 116, such as each PCIe bus of the information handling device 102 to determine which data bus 116 has a peripheral device 114 coupled to it. For example, the device module 302 may scan each PCIe port of the bridge 112, of a motherboard, of the processor 104, or the like, to determine which PCIe port has an attached peripheral device 114.

In certain embodiments, the device module 302 determines each peripheral device 114 of the information handling device 102 at startup. For example, the system BIOS/UEFI 106 may run a scan of each PCIe port on the information handling device 102 to determine or identify each NVMe storage device connected to each PCIe port using a PCIe data bus 116. In a further embodiment, the device module 302 may enumerate or list each determined data bus 116 that is coupled to a peripheral device 114 in a list, table, database, map, or the like, which may later be used by the association module 206 to associate each determined data bus 116 with its corresponding management bus 118 and/or management bus connection 124.

In certain embodiments, the device module 302 enables each management bus connection 124 of a management bus 118 at system startup by initializing each peripheral device 114 communicatively coupled to the information handling device 102 via a data bus 116 and a management bus 118. For example, when the BIOS/UEFI 106 finds an NVMe storage device coupled to a PCIe data bus 116 at system startup, the BIOS/UEFI 106 and/or the NVMe storage device may enable the management bus connection 124 for the NVMe storage device so that the BIOS/UEFI 106 and/or the NVMe storage device can transmit management data over the management bus connection 124 via the management bus 118. Accordingly, enabling each of the management bus connections 124 may allow the BIOS/UEFI 106 to enumerate each of the management bus connections 124 and/or each of the management buses 118 and each of the PCIe data buses 116 that are coupled to an NVMe storage device; however, at this point there is no association or correlation between the PCIe data buses 116 and the management bus connections 124 for each NVMe storage device. Therefore, based on the subject matter disclosed herein, the associations between a data bus 116 and a management bus connection 124 for a peripheral device 114 can be determined.

In some embodiments, the command module 304 scans the list of data buses 116 coupled to peripheral devices 114 that the device module 302 generated, and sends a command to each peripheral device 114 over the listed data buses 116. As described above, in response to the command module 304 sending the commands over the listed data buses 116, the monitor module 204 monitors each management bus 118, which have been enabled by the device module 302, for data (which may be sent in response to the activity module 202 detecting an activity indicator on a peripheral device 114) indicating which peripheral device is associated with the management bus 118, and accordingly, which data bus 116 is associated with the management bus 118. In this manner, a data bus 116 may be dynamically associated with a management bus 118 for a particular peripheral device 114.

The activity module 304, in one embodiment, detects, over a management bus connection 124 of a management bus 118, an activity indicator for a peripheral device 114 in response to the command being sent to the peripheral device 114 over a data bus 116. The activity indicator, in one embodiment, may include an indicator from the peripheral device that indicates that the peripheral device is active. For example, the activity indicator may be a light emitting diode ("LED") on an NVMe storage device that blinks or toggles its state in response to reading or writing data to the NVMe storage device. In another example, the activity indicator may include a sound (e.g., a beep), a signal, a series of signals, and/or the like.

In one embodiment, the activity module 304 detects when an LED on the peripheral device 114 toggles its state between an "off" state, which may be represented by a logical '0', to an "on" state, which may be represented by a logical '1' in response to receiving a command over the data bus 116 coupled to the peripheral device 114. For example, the SEP 115 may be connected to a pin or data line of the peripheral device 114 that indicates whether the LED is toggling its state. The peripheral device 114, the SEP 115, and/or the like may set an active bit for the active peripheral device in a data set, for example, which may be queried by the activity module 304 and/or the monitor module 204 to determine whether the peripheral device 114 was active in response to the sent command.

Figure 4:
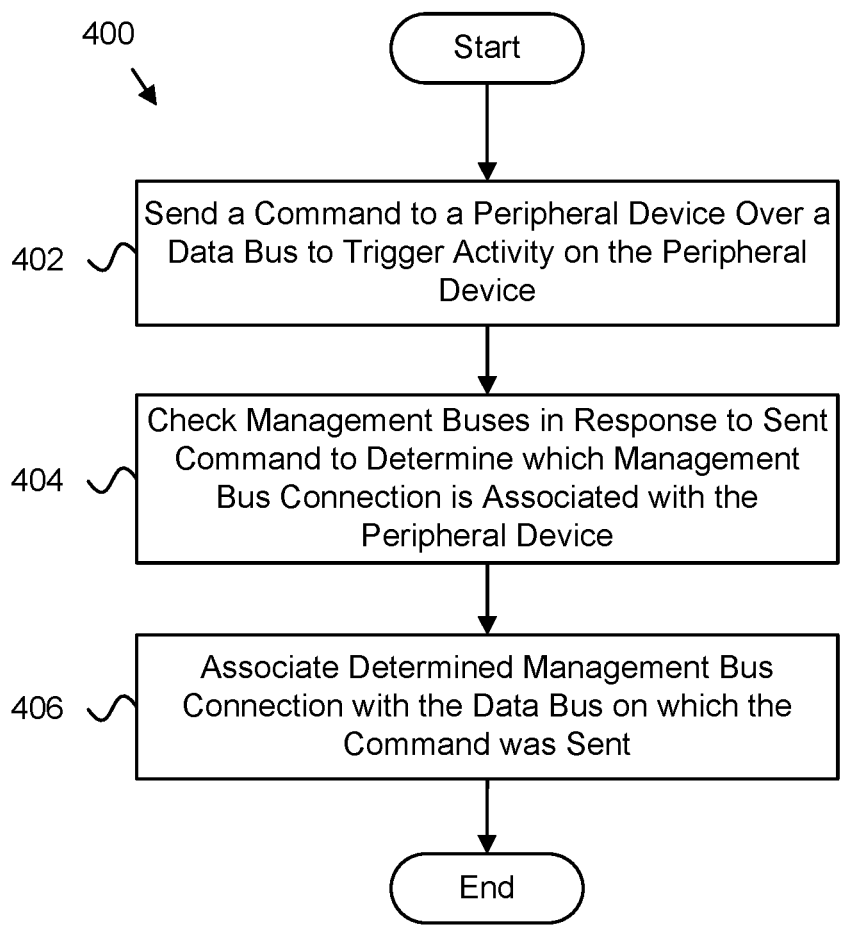
FIG. 4 is a schematic flow chart diagram illustrating one embodiment of a method for associating data buses and management bus connections for peripheral devices.

FIG. 4 is a schematic flow chart diagram depicting one embodiment of a method 400 for associating data buses 116 and management bus connections 124 for peripheral devices 114. The method 400 begins and sends 402 a command to a peripheral device 114 over a data bus 116. The peripheral device 114 is communicatively coupled to an information handling device 102 using a data bus 116 and a separate management bus connection 124.

The method 400 checks 404 one or more management bus connections 124 of a management bus 118 to determine which management bus connection 124 is connected to the peripheral device 114 that was active in response to the sent command. The method 400 associates 406 the determined management bus connection 124 with the data bus 116 on which the command was sent and with the peripheral device 114, and the method 400 ends. In one embodiment, the command module 202, the monitor module 204, and/or the association module 206 perform the various steps of the method 400.

Figure 5:
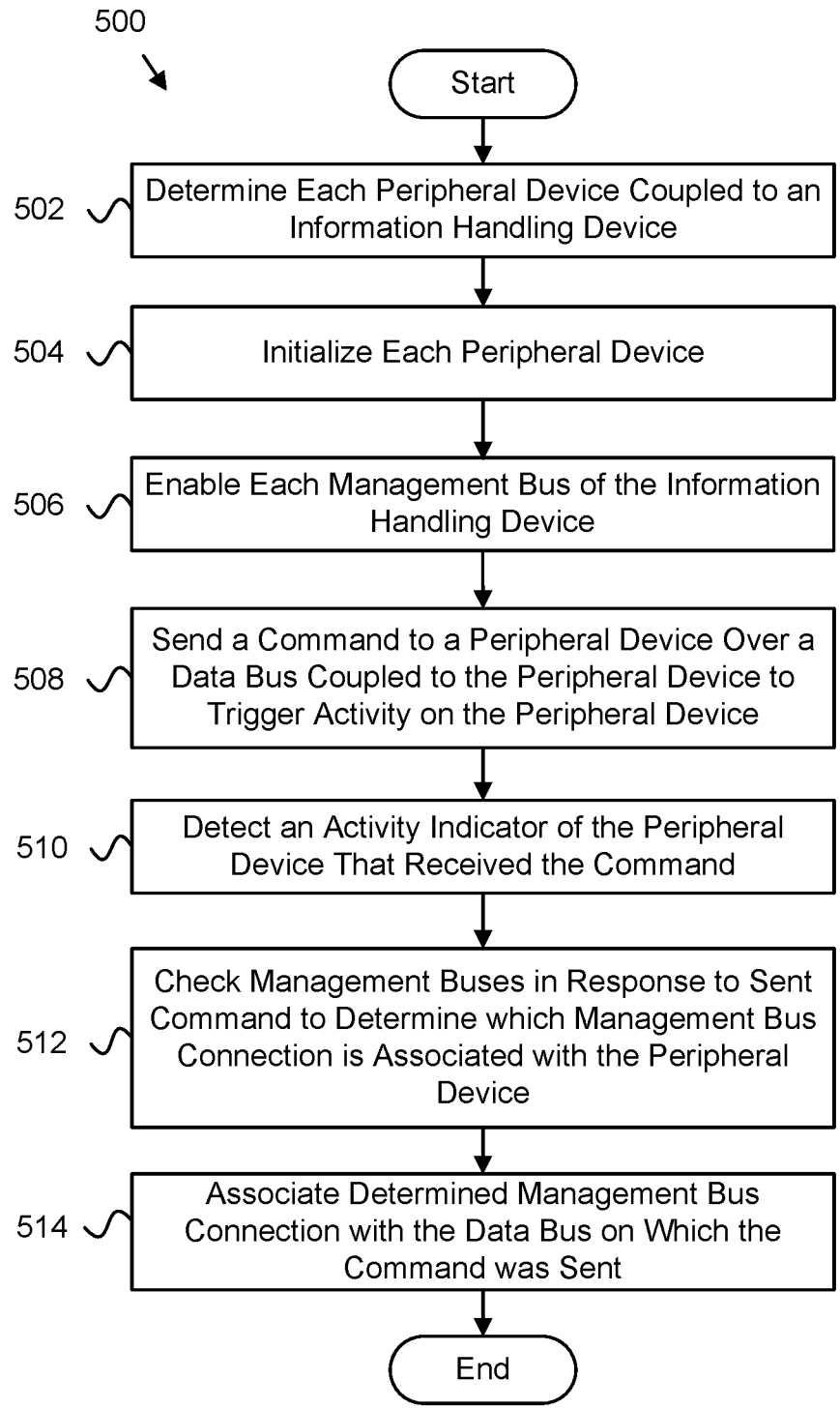
FIG. 5 is a schematic flow chart diagram illustrating one embodiment of another method for associating data buses and management bus connections for peripheral devices.

FIG. 5 is a schematic flow chart diagram depicting one embodiment of a method 500 for associating data buses 116 and management bus connections 124 of a management bus 118 for peripheral devices 114. The method 500 begins and, in one embodiment, determines 502 each peripheral device 114 communicatively coupled to the information handling device 102 at system startup, e.g., when the information handling device 102 is booted. For example, the method 500 may scan each PCIe data bus 116 to determine 502 which PCIe data bus 116 has a peripheral device 114 coupled to it.

In a further embodiment, the method 500 initializes 504 each determined peripheral device 114. For example, the method 500, using a BIOS/UEFI 106, may activate, turn on, enable, or the like each peripheral device 114 coupled to the information handling device 102. The method 500 may further enable 506 each management bus connection 124 of a management bus 118 for the information handling device 102. With each management bus connection 124 enabled, and each data bus 116 determined that has a coupled peripheral device 114, the method 500 can determine which management bus connections 124 are associated with particular data buses 116.

The method 500, in one embodiment, sends 508 a command to each peripheral device 114 to trigger activity on each peripheral device 114. The command, for example, may include a read request command for data stored on a peripheral NVMe storage device. In some embodiments, the data of the read request, e.g., the data read to satisfy the read request, is ignored, discarded, or otherwise not processed or transmitted.

The method 500 detects 510 an activity indicator associated with a peripheral device 114 in response to the command being sent to the peripheral device 114 over a data bus 116. The activity indicator, for example, may be an LED activity light that toggles on and off when data is read or written from/to an NVMe storage device. The method 500 detects 510 the LED changing states from an on state to an off state. In response to the detected activity, the method 500 may set (not shown) an active bit of a data set associated with the peripheral device and/or proactively send a message, e.g., a management message, on the management bus connection 124 coupled to the peripheral device 114 that indicates the peripheral device was active.

The method 500 checks 512 one or more management bus connections 124 of a management bus 118 to determine which of the one or more management bus connections 124 is coupled to the peripheral device 114 that received the command over the data bus 116. The method 500, for example, may read data over a management bus connection 124 associated with peripheral device 114 to determine if an active bit has been set for the peripheral device in response to the sent command. In one embodiment, the method 500 associates 516 the determined management bus connection 124 of the management bus 118, with the data bus 116 that the command was sent on, and stores the association, correlation, relationship, or the like in a table, list, or the like for future reference, and the method 500 ends. In one embodiment, the command module 202, the monitor module 204, the association module 206, the device module 302, and/or the activity module 304 perform the various steps of the method 500.

Figure 6:
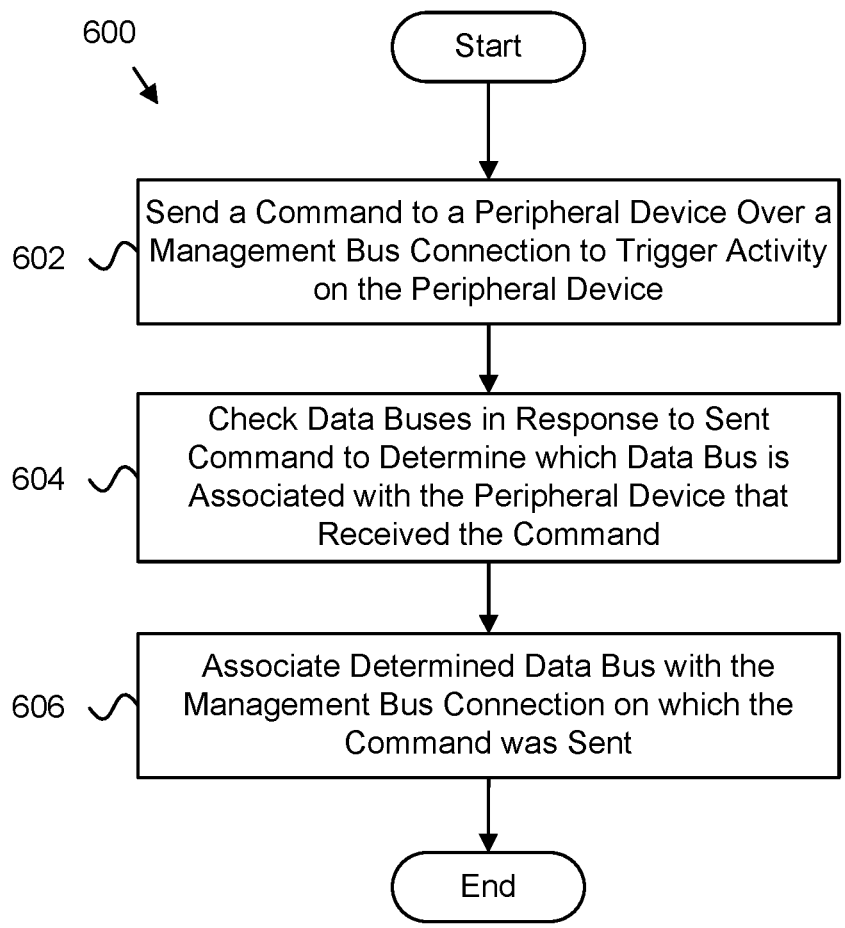
FIG. 6 is a schematic flow chart diagram illustrating one embodiment of a method for associating data buses and management bus connections for peripheral devices.

FIG. 6 is a schematic flow chart diagram depicting one embodiment of a method 600 for associating data buses 116 and management bus connections 124 for peripheral devices 114. The method 600 begins and sends 602 a management command to a peripheral device 114 over a management bus connection 124 of a management bus 118. The peripheral device 114 is communicatively coupled to an information handling device 102 using a data bus 116 and a separate management bus connection 124.

The method 600 checks 604 one or more data buses 116 to determine which data bus 116 is connected to the peripheral device 114 that was responsive to the management command sent on the management bus connection 124. For example, the method 600 may send 602 a reset command or other management command to a peripheral device 114 connected to a particular management bus connection 124. The reset or other management command causes the peripheral device 114 to act differently than other connected peripheral devices 114, as seen from the one or more data buses 116. The method 600 may then check each peripheral device 114 by sending a data bus command, such as a read request command, over each data bus 116 connected to a peripheral device 114 to determine which peripheral device 114 is unresponsive to the management command, or otherwise provides a response different than responses from other peripheral devices 114 not receiving the management command. Therefore, the method 600 discerns which data bus 116 is connected to the peripheral device 114 that received the management command.

The method 600 associates 606 the determined data bus 116 connected to the peripheral device 114 that received the management command with the management bus connection 124 on which the command was sent and with the peripheral device 114, and the method 600 ends. In one embodiment, the command module 202, the monitor module 204, and/or the association module 206 perform the various steps of the method 600.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a command module that sends a command to a peripheral device of one or more peripheral devices to trigger activity on the peripheral device, each of the one or more peripheral devices communicatively coupled to an information handling device through a data bus and through a management bus connection of one or more management buses that are separate from the data bus, the command sent over the data bus connected to the peripheral device, wherein data received from the peripheral device over the data bus in response to the sent command is ignored;
a monitor module that checks the one or more management buses of the information handling device for an indication of which management bus connection of the one or more management buses is connected to the peripheral device that was active in response to the activity that was triggered on the peripheral device based on the sent command; and
an association module that associates the determined management bus connection with the data bus on which the command was sent and with the peripheral device, wherein said modules comprise one or more of hardware circuits, programmable hardware devices, and a processor executing code.

2. The apparatus of claim 1, wherein the monitor module polls each of the one or more peripheral devices using a management bus connection to each of the one or more management buses until the monitor module determines which peripheral device of the one or more peripheral devices was active in response to the sent command.

3. The apparatus of claim 2, wherein the monitor module determines whether a peripheral device of the one or more peripheral devices is active by reading data available through a management bus connection to a peripheral device, the data comprising information indicating whether the peripheral device was active in response to the sent command.

4. The apparatus of claim 1, wherein each of the one or more peripheral devices is connected to one or more addressable management buses and a management bus connection to a peripheral device of the one or more peripheral devices comprises an addressable management bus connection.

5. The apparatus of claim 1, wherein each of the one or more peripheral devices is connected to a separate management bus, wherein each management bus connection comprises a connection over a single management bus between the information handling device and a peripheral device of the one or more peripheral devices.

6. The apparatus of claim 1, wherein the monitor module monitors each of the one or more management bus connections for data sent from the peripheral device, responsive to the command, that indicates which of the one or more management bus connections is coupled to the peripheral device.

7. The apparatus of claim 1, wherein the association module maintains a map of associations between management bus connections, data buses, and peripheral devices such that a management bus connection coupled to a peripheral device is correlated with a data bus coupled to the peripheral device.

8. The apparatus of claim 1, further comprising a device module that determines, at system startup, the one or more peripheral devices communicatively coupled to the information handling device by determining which of a plurality of data buses are connected to a peripheral device.

9. The apparatus of claim 8, wherein the command module sends the command to a peripheral device, the monitor module determines a management bus connection, and the association module associates the data bus, the peripheral bus, and the management connection for each determined peripheral device.

10. The apparatus of claim 1, wherein the command module repeatedly sends the command until the monitor module determines which management bus connection is connected to the peripheral device that was active in response to the sent command.

11. The apparatus of claim 1, wherein the command sent to the peripheral device on the data bus comprises a read request command for data stored on the peripheral device, the peripheral device comprising a peripheral storage device, wherein the data of the read request is discarded without being processed by the information handling device.

12. The apparatus of claim 1, further comprising an activity module that detects, over a management bus connection of the one or more management buses, an activity indicator for the peripheral device, the activity indicator triggered in response to the peripheral device processing the command sent to the peripheral device.

13. The apparatus of claim 12, wherein the activity indicator comprises detecting a light emitting diode ("LED") toggle its state between on and off.

14. The apparatus of claim 1, wherein the peripheral device comprises a non-volatile memory express ("NVMe") storage device.

15. The apparatus of claim 1, wherein the data bus comprises a peripheral component interconnect express ("PCIe") communication bus.

16. A method comprising:
sending a command to a peripheral device of one or more peripheral devices to trigger activity on the peripheral device, each of the one or more peripheral devices communicatively coupled to an information handling device through a data bus and through a management bus connection of one or more management buses that are separate from the data bus, the command sent over the data bus connected to the peripheral device, wherein data received from the peripheral device over the data bus in response to the sent command is ignored;
checking the one or more management buses of the information handling device for an indication of which management bus connection of the one or more management buses is connected to the peripheral device that was active in response to the activity that was triggered on the peripheral device based on the sent command; and
associating the determined management bus connection with the data bus on which the command was sent and with the peripheral device.

17. The method of claim 16, further comprising polling each of the one or more peripheral devices using a management bus connection to each of the one or more management buses until it is determined which peripheral device of the one or more peripheral devices was active in response to the sent command.

18. The method of claim 17, wherein determining whether a peripheral device of the one or more peripheral devices is active comprises reading data available through a management bus connection to a peripheral device, the data comprising information indicating whether the peripheral device was active in response to the sent command.

19. The method of claim 16, wherein each of the one or more peripheral devices is connected to one or more addressable management buses and a management bus connection to a peripheral device of the one or more peripheral devices comprises an addressable management bus connection.

20. A program product comprising a non-transitory computer readable storage medium that stores code executable by a processor, the executable code comprising code to perform:
sending a command to a peripheral device of one or more peripheral devices to trigger activity on the peripheral device, each of the one or more peripheral devices communicatively coupled to an information handling device through a data bus and through a management bus connection of one or more management buses that are separate from the data bus, the command sent over the data bus connected to the peripheral device, wherein data received from the peripheral device over the data bus in response to the sent command is ignored;
checking the one or more management buses of the information handling device for an indication of which management bus connection of the one or more management buses is connected to the peripheral device that was active in response to the activity that was triggered on the peripheral device based on the sent command; and
associating the determined management bus connection with the data bus on which the command was sent and with the peripheral device.

* * * * *